(12) United States Patent
Marten et al.

(10) Patent No.: US 7,795,322 B2
(45) Date of Patent: Sep. 14, 2010

(54) PREPOLYMERS AND CELLULAR POLYISOCYANATE POLYADDITION PRODUCTS PRODUCED THEREFROM

(75) Inventors: Elke Marten, Ostercappeln (DE); Elke Weigelt, Osnabrück (DE); Anand G. Huprikar, Novi, MI (US); Michael Strauβ, Lemförde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/908,147

(22) PCT Filed: Mar. 8, 2006

(86) PCT No.: PCT/EP2006/060566

§ 371 (c)(1),
(2), (4) Date: Sep. 10, 2007

(87) PCT Pub. No.: WO2006/094998

PCT Pub. Date: Sep. 14, 2006

(65) Prior Publication Data

US 2008/0161440 A1    Jul. 3, 2008

(30) Foreign Application Priority Data

Mar. 11, 2005    (DE) .................. 10 2005 011 784

(51) Int. Cl.
*C08G 18/10*    (2006.01)
(52) U.S. Cl. .................. 521/159; 521/130; 521/137; 521/170; 521/174; 528/61; 528/64; 528/65; 528/76; 528/77; 528/85
(58) Field of Classification Search .................. 521/130, 521/137, 159, 170, 174; 528/61, 64, 65, 528/76, 77, 85
See application file for complete search history.

(56) References Cited

U.S. PATENT DOCUMENTS

| | | | |
|---|---|---|---|
| 4,647,596 A | | 3/1987 | Ishii et al. |
| 5,686,042 A | * | 11/1997 | Slack et al. .............. 264/328.6 |
| 6,255,431 B1 | * | 7/2001 | Fishback et al. .............. 528/44 |
| 6,420,445 B1 | * | 7/2002 | Barksby et al. ............. 521/159 |
| 6,624,281 B1 | * | 9/2003 | Lawrey ....................... 528/61 |

FOREIGN PATENT DOCUMENTS

| | | |
|---|---|---|
| DE | 3613961 A1 | 10/1986 |
| EP | 0449331 A2 | 10/1991 |
| EP | 0601383 A1 | 6/1994 |
| EP | 1367072 A1 | 12/2003 |
| EP | 1367076 A1 | 12/2003 |
| WO | WO-91/17197 A1 | 11/1991 |
| WO | WO-01/18086 A1 | 3/2001 |

* cited by examiner

*Primary Examiner*—John Cooney
(74) *Attorney, Agent, or Firm*—Connolly Bove Lodge & Hutz LLP (57) ABSTRACT

A prepolymer having an NCO content of less than 10%, based on the reaction of (a) diisocyanate with (b) polyether alcohol, the (b) polyether alcohol comprising (b1) and (b2) and/or (b3) with the following meanings for (b1), (b2) and (b3):

(b1) polytetrahydrofuran having a molecular weight of from 1800 to 2100 g/mol and
(b2) polyether alcohol having a molecular weight of from 500 to 7000 g/mol, based on ethylene oxide and/or propylene oxide,
and/or
(b3) polytetrahydrofuran having a molecular weight of from 800 to 1200 g/mol.

9 Claims, 1 Drawing Sheet

FIGURE 1: Spring Element (including bending lip)

US 7,795,322 B2

PREPOLYMERS AND CELLULAR POLYISOCYANATE POLYADDITION PRODUCTS PRODUCED THEREFROM

RELATED APPLICATIONS

This application is a national stage application (under 35 U.S.C. §371) of PCT/EP2006/060566, filed Mar. 8, 2006, which claims benefit of German application 10 2005 011 784.8, filed Mar. 11, 2005.

The invention relates to a prepolymer having an NCO content of less than 10%, preferably from 2% to 8%, particularly preferably from 4% to 7%, based on the reaction of (a) diisocyanate, preferably comprising diphenylmethane 2,2'-, 2,4'- and/or 4,4'-diisocyanate (MDI), with (b) polyether alcohol, preferably having an average functionality, preferably an actual average functionality of from 1.7 to 2.7, preferably from 1.7 to 2.1, particularly preferably from 1.9 to 2.1, the (b) polyether alcohol comprising (b1) and (b2) and/or (b3) with the following meanings for (b1), (b2) and (b3):

- (b1) polytetrahydrofuran having a molecular weight of from 1800 g/mol to 2100 g/mol, preferably from 1900 g/mol to 2100 g/mol, particularly preferably from 1901 g/mol to 2100 g/mol, and
- (b2) polyether alcohol, preferably having a particularly preferred nominal functionality of 2 or 3, having a molecular weight of from 500 g/mol to 7000 g/mol, based on ethylene oxide and/or propylene oxide, and/or
- (b3) polytetrahydrofuran having a molecular weight of from 800 g/mol to 1200 g/mol.

The invention furthermore relates to a process for the preparation of cellular polyisocyanate polyadducts, particularly preferably cellular polyurethane elastomers, which, if appropriate, may comprise isocyanurate and/or urea structures, in particular cellular polyisocyanate polyadducts having a density, according to DIN EN ISO 845, of from 200 to 800 kg/m$^3$, preferably from 300 to 600 kg/m$^3$, a tensile strength, according to DIN EN ISO 1798, of $\geq$2.0 N/mm$^2$, preferably $\geq$2.5 N/mm$^2$, an elongation at break, according to DIN EN ISO 1798, of $\geq$200%, preferably $\geq$350%, and a tear propagation resistance, according to DIN ISO 34-1 B (b), of $\geq$8 N/mm and particularly preferably a compression set (40% deformation; 22 hours at 80° C. and 2 h at 23° C.), based on DIN EN ISO 1856, of less than 40%, in which a prepolymer having isocyanate groups and an NCO content of less than 10%, preferably from 2 to 8%, particularly preferably from 4% to 7%, particularly preferably a prepolymer according to any of the claims, is prepared by reacting (a) diisocyanate, preferably diphenylmethane 2,2'-, 2,4'- and/or 4,4'-diisocyanate (MDI), with (b) polyether alcohol, preferably having an average functionality, preferably an actual average functionality of 1.7 to 2.7, preferably from 1.7 to 2.1, and this prepolymer is then reacted in a mold with a crosslinking component comprising (e) water, and, if appropriate, (d) fatty acid sulfates, preferably from 0.005 to 1% by weight of fatty acid sulfates, based on the weight of the cellular polyisocyanate polyadducts, polyether alcohol (b) used being (b1) and (b2) and/or (b3) with the following meanings for (b1), (b2) and (b3):

- (b1) polytetrahydrofuran having a molecular weight of from 1800 g/mol to 2100 g/mol, preferably from 1900 g/mol to 2100 g/mol, particularly preferably from 1901 g/mol to 2100 g/mol, and
- (b2) polyether alcohol, preferably having a particularly preferred nominal functionality of 2 or 3, having a molecular weight of from 500 g/mol to 7000 g/mol, based on ethylene oxide and/or propylene oxide, and/or
- (b3) polytetrahydrofuran having a molecular weight of from 800 g/mol to 1200 g/mol.

The invention also relates to cellular polyisocyanate polyadducts obtainable in this manner, preferably cellular, particularly preferably microcellular polyurethane elastomers which, if appropriate, may comprise isocyanurate and/or urea structures, in particular cylindrical, preferably hollow moldings, in particular hollow cylindrical automotive overload springs, preferably for motor vehicle shock absorbers, particularly preferably motor vehicle shock absorbers comprising hollow cylindrical automotive overload springs.

Cellular, for example microcellular, polyisocyanate polyadducts, usually polyurethanes and/or polyisocyanurates, which, if appropriate, may comprise urea structures and are obtainable by reacting isocyanates with compounds reactive toward isocyanates, and processes for their preparation are generally known. A particular development of these products comprises cellular, in particular microcellular, polyurethane elastomers which differ from conventional polyurethane foams in their substantially higher density of, usually, from 200 to 800 kg/m$^3$, their particular physical properties and resulting potential applications. Such polyurethane elastomers are used, for example, as vibration-damping and shock-absorbing elements, in particular in automotive construction. In automobiles, for example within the total shock-absorbing strut construction, consisting of shock absorber, coil and elastomer spring, the suspension elements produced from polyurethane elastomer are pushed onto the piston rod of the shock absorber.

Products which are produced using a prepolymer having a low NCO content ("full prepolymer") are distinguished by relatively temperature-stable urea hard phases. Particularly at high dynamic load (i.e. high force and/or high frequency), elevated temperatures (>80° C.) occur in the springs. Springs having a urea hard phase exhibit a higher dynamic performance compared with products having a urethane hard phase (based on prepolymers having a high NCO content, e.g. NCO=14-20% "semi-prepolymer"). In the case of the cellular elastomers, the urea hard phases are usually synthesized by the reaction of water with isocyanate. The carbamic acid formed decomposes into carbon dioxide and amine, which reacts with isocyanate with formation of urea.

In cellular PUR elastomers having a urea hard phase, polyesterol-containing soft phases lead to the highest dynamic property level. Such products are generally known. Thus, WO 2001018086 A1 describes the use of polyester polyetherol (produced by polycondensation from polyoxytetramethylene glycol having an average molecular weight of from 220 to 270 g/mol and adipic acid) for the preparation of cellular PUR elastomers having good dynamic properties and high low-temperature flexibility. Owing to the ester bonds, however, the resulting foam is sensitive to hydrolysis.

DE-A 3613964 describes the preparation of products based on pure polyester or polyester polyetherols soft phases. The test specimens mentioned in the comparative example in DE-A 3613964 and based on polytetrahydrofuran (M=2000 g/mol) as the soft phase have only a comparatively low flexural stability (cf. comparative example 3 in Table 1 in DE 3613964).

It was therefore an object of the invention to provide cellular polyisocyanate polyadducts, preferably cellular polyurethane elastomers, preferably those having a density of from 200 to 800, particularly preferably from 300 to 600, kg/m$^3$, which have high dynamic load capacity (in particular with outstanding tensile strengths, elongations, propagation resistances and compression sets) and are economical and have very good microbe resistance and stability to hydrolysis. Furthermore, the cellular polyurethane elastomers should have a low water absorption and should be flexible at low temperatures. A particular challenge was also to be able to demold components having strong undercuts, such as, for example, bending lips of damping elements, without cracks. The cellular polyurethane elastomers should be capable of being used in particular as damping elements, for example in automotive construction. Furthermore, these cellular polyisocyanate polyadducts should be simple and economical to produce and in particular should be based on the prepolymer component which is easy to handle. It was therefore also an object of the present invention to provide a suitable prepolymer by means of which it is possible to obtain cellular polyisocyanate polyadducts which have the advantages and improvements described at the outset.

This object could be achieved by the prepolymer described at the outset.

The prepolymer according to the invention is distinguished by the fact that considerable advantages in the processing properties on the one hand and in the material properties of the cellular polyurethane elastomers on the other hand could be achieved by the polyol combination according to the invention, i.e. by the use of (b1) together with (b2) or the use of (b1) with (b3) or the use of (b1) with (b2) and (b3). With the prepolymer according to the invention, it was even possible to demold components having relatively strong undercuts after a short curing time without cracks. The cellular polyurethane elastomers had good dynamic component properties and were stable to hydrolysis and microbes. By using the polyol combination according to the invention, it was possible to reduce soft phase crystallization caused by (b1), which has led to a substantial improvement in the low-temperature flexibility.

Moreover, the prepolymer according to the invention has the advantage that it has an excellent shelf life and hence considerable advantages in handling. The prepolymer according to the invention can be melted and foamed again even after cooling to 0° C. without sacrifices in the material properties. Owing to the substantially lower melting point of MDI in comparison with NDI ($T_m$ (NDI)-127° C. and $T_m$ (MDI)=38° C.) in particular the preferred prepolymers based on MDI as isocyanate can be cooled to room temperature after their preparation and, if required, melted again to the temperature of use of 60-90° C. after a storage time of several weeks. This too is a particular advantage of the prepolymers according to the invention in their handling and processing to give the cellular polyisocyanate polyadducts.

A prepolymer in which the weight ratio of (b1) to the sum of (b2) and (b3), where the weight of (b2) and (b3) may be zero, is from 11:1 to 2:1, particularly preferably from 9:1 to 2:1, is preferred.

A prepolymer in which the (b) polyether alcohol comprises (b1) and (b2) and the polyether alcohol (b2) has a hydroxyl number of less than 500 mg KOH/g, preferably from 16 mg KOH/g to 340 mg KOH/g, particularly preferably from 16 mg KOH/g to 80 mg KOH/g, and preferably a nominal functionality of 2 or 3 is preferred. Such polyether alcohols (b2) may be based on conventional difunctional and/or trifunctional initiators which are alkoxylated with ethylene oxide and/or propylene oxide, e.g. blockwise or randomly, i.e. in mixed form.

Trifunctional polyether alcohols (b2) which may be used are glycerol- and/or trimethylolpropane-initiated polyoxypropylene glycols, polyoxyethylene glycols and polyether alcohols which have ethylene oxide and propylene oxide units blockwise or in mixed form. Particularly preferably, the glycerol-initiated polyoxypropylene (particularly preferably from 75 to 90% by weight)—polyoxyethylene (particularly preferably from 10 to 25% by weight) glycol may be present in the prepolymer particularly preferably having a hydroxyl number of from 20 to 60, particularly preferably from 25 to 50, mg KOH/g. Furthermore, a trimethylolpropane-initiated polyoxypropylene glycol or polyoxyethylene glycol, particularly preferably having a hydroxyl number of from 100 to 250, particularly preferably from 150 to 250, mg KOH/g, is particularly preferred as polyether alcohol (b2).

A difunctional or trifunctional polyether alcohol is particularly preferably used as (b2). (b3) is also used in addition to (b1), a trifunctional (b2) is preferably also used.

Prepolymers in which the (b) polyether alcohol comprises (b1) and (b3) are preferred. The mixture comprising (b1) and (b3) preferably has an average molecular weight of from 1500 g/mol to 1900 g/mol, particularly preferably from 1700 g/mol to 1900 g/mol.

Polytetrahydrofurans (also referred to in this document as PTHF) are polyols which are prepared by cationic polymerization of tetrahydrofuran. Polytetrahydrofuran is generally known and is commercially available in various molecular weights from BASF Aktiengesellschaft.

The prepolymer can particularly preferably comprise allophanate groups. These allophanates can be synthesized during the prepolymer preparation by means of reaction temperatures above 100° C., preferably 120-150° C. The prepolymer preparation can therefore preferably be effected by a procedure in which MDI heated to a temperature above 40° C., particularly preferably 50° C., is added to the initially taken polyether alcohols (b) heated to above 120° C.

Particularly preferably, the prepolymer according to the invention is based on the reaction of (a) diisocyanate with the polyether alcohols (b) according to the invention, having a molecular weight of from 500 g/mol to 7000 g/mol, compounds (b4) which have a nominal functionality of 3 and a molecular weight of less than 500 g/mol, preferably polyether alcohol initiated with glycerol and/or trimethylolpropane, particularly preferably initiated with trimethylpropane, and based on ethylene oxide and/or propylene oxide, being used in addition to polyether alcohol (b) as compounds reactive toward isocyanates, preferably compounds having hydroxyl groups, particularly preferably triols.

By adding a triol as (b2) and/or (b4), preferably as (b2), crosslinking points can be established within the soft phase. The use of a trifunctional polyether alcohol (b2) is preferred since this is readily miscible with (b1) and preferably has a reactivity comparable with that of MDI. Since no allophanates need be synthesized in this case a maximum reaction temperature of 80-95° C. is sufficient.

Figure 1:
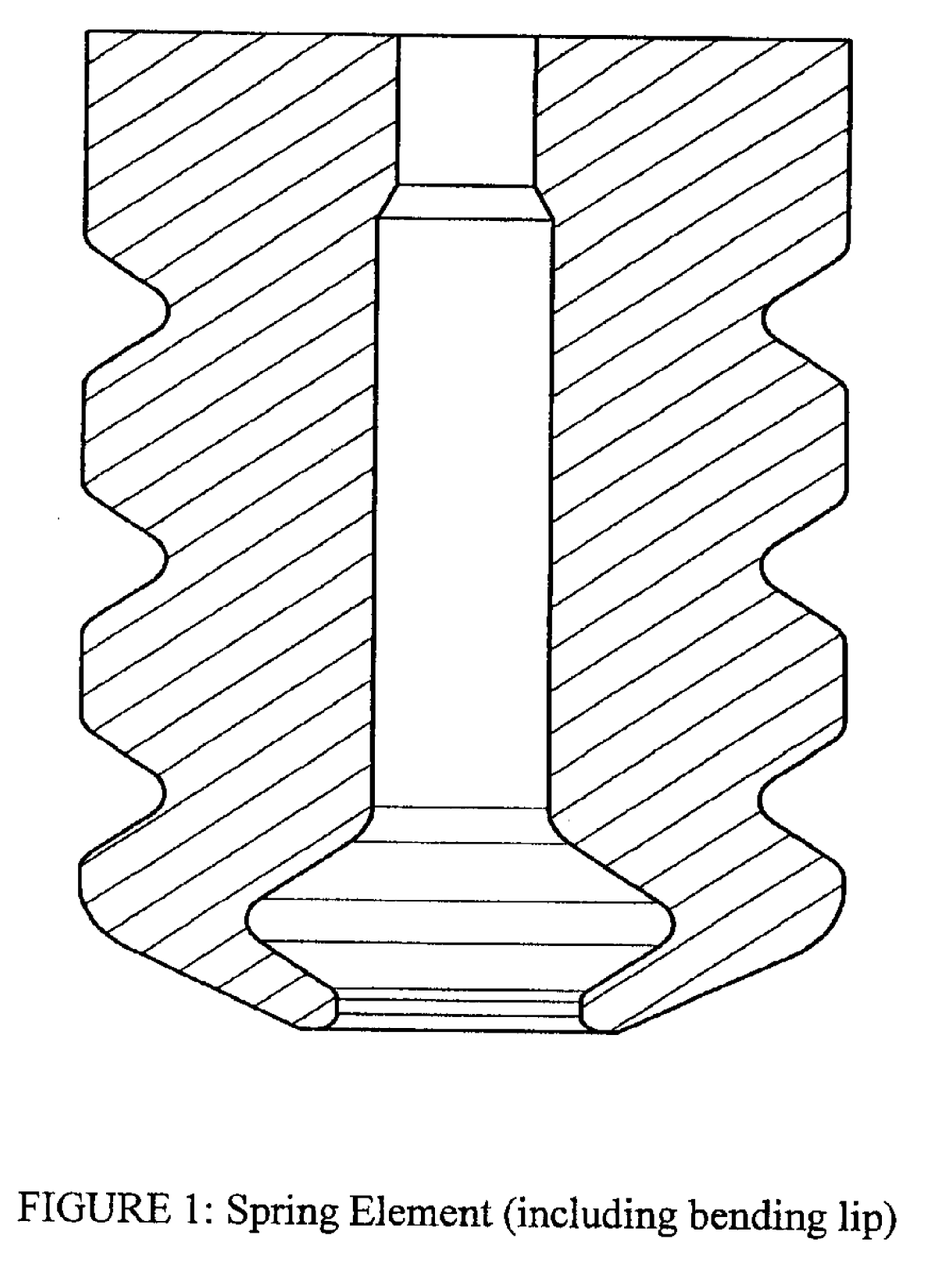
FIG. 1 depicts a spring element that includes a bending lip.

Products particularly preferred according to the invention are cylindrical, preferably hollow moldings, in particular hollow cylindrical automotive hollow springs, preferably for motor vehicle shock absorbers, particularly preferably motor vehicle shock absorbers comprising hollow cylindrical automotive overload springs based on cellular polyisocyanate polyadducts according to the invention. The expression "cylindrical" is to be understood as meaning not only moldings which have a circular base area and a constant radius over the height but also moldings which have an oval cross section and/or an oval base area. Moldings in which only sections along the longitudinal axis have a round or oval cross section are by definition also covered by the expression "cylindrical" in this document. This term "cylindrical" also covers moldings in which the radius varies over the length, i.e. in which the molding has constrictions and/or bulges. Cylindrical moldings which have a circular cross section are preferred. An example of a cylindrical overload spring is shown in FIG. 1 in the examples. In this document the expression "hollow" moldings is to be understood as meaning those moldings which have a cavity along the longitudinal axis, preferably concentrically along the longitudinal axis. The expression "hollow" is preferably to be understood as meaning that a continuous, preferably concentric cavity is present in the molding along the entire longitudinal axis of the molding. These preferred forms, i.e. the hollow cylindrical moldings are generally known as overload springs and are widely used. The production of these moldings in corresponding forms is widely described and is generally known to the person skilled in the art for example from DE-C 44 38 143.

The present invention also relates, as described at the outset, to a process for the preparation of cellular polyisocyanate polyadducts, in which a prepolymer having isocyanate groups and an NCO content of less than 10%, preferably from 2 to 8%, particularly preferably from 4% to 7%, particularly preferably a prepolymer according to the invention, in particular a prepolymer according to any of the claims, is prepared, preferably in a two-stage process, by reacting (a) diisocyanate, preferably diphenylmethane 2,2'-, 2,4'- and/or 4,4'-diisocyanate (MDI), with (b) polyether alcohol, preferably having an average functionality, preferably an actual average functionality of from 1.7 to 2.7, particularly preferably from 1.7 to 2.1, and this prepolymer is then reacted in a mold with a crosslinking component comprising (e) water and, if appropriate, (d) fatty acid sulfates, preferably from 0.005 to 1% by weight of fatty acid sulfates, based on the weight of the cellular polyisocyanate polyadducts, polyether alcohol (b) used being (b1) and (b2) and/or (b3) with the following meanings for (b1), (b2) and (b3):

(b1) polytetrahydrofuran having a molecular weight of from 1800 g/mol to 2100 g/mol, preferably from 1900 g/mol to 2100 g/mol, particularly preferably from 1901 g/mol to 2100 g/mol, and (b2) polyether alcohol having a molecular weight of from 500 g/mol to 7000 g/mol, based on ethylene oxide and/or propylene oxide, and/or (b3) polytetrahydrofuran having a molecular weight of from 800 g/mol to 1200 g/mol.

The process according to the invention is effected in a manner such that, in a two-stage process, the prepolymer having isocyanate groups is prepared in the first stage by reacting (a) with (b) and this prepolymer is reacted in the second stage in a mold with a crosslinking component comprising (d) sulfated fatty acid esters and (e) water, it being possible for (c) polysiloxanes and, if appropriate, (f) catalysts, (g) blowing agents and/or (h) additives to be present in the prepolymer and/or the crosslinking component. The crosslinking component may comprise carbodiimides (h).

The crosslinking component thus preferably also comprises (d) sulfated fatty acid esters, preferably from 0.005 to 1% by weight of sulfated fatty acid esters, based on the weight of the cellular polyisocyanate polyadducts, and catalysts (f) and, if appropriate, (c) polysiloxanes, (g) blowing agents and/or assistants (h), in addition to the (e) water. The stated amount with respect to the fatty acid ester are based on the weight of the sulfated fatty acid esters without water.

Catalysts preferably present in the crosslinking component may be tin compounds, particularly preferably tin(IV) compounds, particularly preferably di-n-octyltin(IV) bis(2-ethylhexylthioglycolate and/or n-octyltin(IV) tris(2-ethylhexylthioglycolate). As a result, the required curing time could be substantially reduced. A comparable effect could not be achieved by a simple increase in the amount of amine catalyst. Particularly preferably, the crosslinking component comprises amine catalyst, in particular tertiary amines, particularly preferably bis(dimethylaminoethyl)ether, 1,4-diazabicyclo[2,2,2]-octane, N,N,N',N'',N''-pentamethyldiethylenediamine, N-methylimidazole, N-propylimidazole and/or N-(2-dimethyaminoethyl)-N'-piperazine, in addition to the tin compounds.

Generally known compounds can be used as polysiloxanes, for example polymethylsiloxanes, polydimethylsiloxanes and/or polyoxyalkylene-silicone copolymers. For example, compounds of the following general structural formula are suitable:

where
X: —CH$_3$, —CH$_2$CH$_3$, —[CH$_2$CH$_2$—O—]$_m$—OH;
Y: —CH$_3$, —CH$_2$CH$_3$, —[CH$_2$CH$_2$—O—]$_m$—OH;
Z: —OH, —R—OH, —R—SH, —R—NH—R, —[CH$_2$CH$_2$—O—]$_m$—OH;
n: 1 to 100;
m: 1 to 100;
R: alkyl, —O-alkyl, —S-alkyl, —NH-alkyl having 1 to 20 carbon atoms in the alkyl radical.

The polysiloxanes preferably have a viscosity of from 20 to 2000 mPas at 25° C.

Sulfated fatty acid esters used may be generally known sulfated fatty acid esters which are also commercially available. Sulfated castor oil is preferably used as the sulfated fatty acid ester.

The amount of sulfated fatty acid esters is preferably not outside the preferred ranges since in particular a substantially improved, i.e. low water absorption of the moldings is not achieved with a larger amount of this emulsifier. If further amounts of emulsifiers were to be required owing to the use of further compounds in the crosslinking component, which will be described below, for example hydrolysis stabilizers, e.g. carbodiimides, for a sufficient homogenization of this crosslinking component, for example, further generally known emulsifiers can be used over and above the amount according to the invention of sulfated fatty acid esters or as a complete replacement of the sulfated fatty acid esters, for example polyglycol esters of fatty acids, alkoxylates of fatty acids, preferably polyethylene glycol esters, polypropylene glycol esters, polyethylene polypropylene glycol esters, ethoxylates and/or propoxylates of linoleic acid, linolenic acid, oleic acid or arachidonic acid, particularly preferably oleic acid ethoxylates.

The sulfated fatty acid ester may preferably be used as aqueous solutions, for example as 50% strength aqueous solutions.

The preparation of the cellular polyisocyanate polyadducts according to the invention is preferably carried out in a mold at a surface temperature of the inner mold wall from 60 to 90° C. The term "surface temperature of the inner mold wall" is to be understood as meaning the temperature of the surface of the inner wall of the mold, i.e. the surface of the mold which is usually in contact with the reaction system during the production of the shaped articles, during the production of the shaped articles, at least briefly, preferably for at least 10 min.

The cellular polyisocyanate polyadducts according to the invention preferably have a glass transition temperature of less than −50° C., a tensile strength, according to DIN EN ISO 1798, of ≧2, preferably ≧3 N/mm², an elongation at break, according to DIN EN ISO 1798, of ≧200, preferably ≧300%, and a tear propagation resistance, according to DIN ISO 34-1B(b), of ≧8 N/mm and particularly preferably a compression set (at 80° C.), based on DIN 53572, of less than 40%.

The water absorption of the cellular polyisocyanate polyadducts is particularly preferably less than 50, preferably less than 30, % by weight, particularly preferably less than 20%, based on the weight of the polyisocyanate polyadduct.

The cellular polyisocyanate polyadducts according to the invention, also referred to below as "moldings", are used as damping elements in vehicle construction, for example in automotive construction, for example as overload springs, buffers, transverse link bearings, rear axle subframe bearings, stabilizer bearings, long strut bearings, shock absorbing strut bearings, shock absorber bearings, bearings for long and short arm suspensions and/or as an emergency wheel which is present in the rim and, for example in the event of tire damage, ensures that the vehicle runs on the cellular polyisocyanate polyadduct and remains steerable.

The moldings according to the invention, i.e. the cellular polyisocyanate polyadducts, preferably the microcellular polyurethane elastomers accordingly not only have excellent mechanical and dynamic properties but in particular the stability to hydrolysis, the microbe resistance and the low-temperature flexibility could be substantially improved according to the invention as desired. In particular, this combination of particularly advantageous properties is not known from the prior art.

The production of the shaped articles is advantageously carried out at an NCO/OH ratio of from 0.85 to 1.20, the heated starting components being mixed and being introduced, in an amount corresponding to the desired density of the shaped article, into a heated, preferably tightly sealing mold.

The shaped articles have cured after from 5 to 40 minutes and can thus be removed from the mold.

The amount of reaction mixture introduced into the mold is usually such that the moldings obtained have the density stated above. The cellular polyisocyanate polyadducts obtainable according to the invention preferably have a density according to DIN EN ISO 845, of from 200 to 800, particularly preferably from 300 to 600, kg/m³.

The starting components are usually introduced into the mold at a temperature of from 15 to 120° C., preferably from 30 to 110° C. The degrees of densification for the production of the moldings are from 1.1 to 8, preferably from 2 to 6.

The cellular polyisocyanate polyadducts according to the invention are expediently prepared by the one-shot process with the aid of the low pressure technique or in particular the reaction injection molding (RIM) technique in open or, preferably, closed molds. The reaction is carried out in particular with densification in a closed mold. The reaction injection molding technique is described, for example, by H. Piechota and H. Röhr in "Integraischaumstoffe", Carl Hanser-Verlag, Munich, Vienna, 1975; D. J. Prepelka and J. L. Wharton in Journal of Cellular Plastics, March/April 1975, pages 87 to 98, and U. Knipp in Journal of Cellular Plastics, March/April 1973, pages 76-84.

With the use of a mixing chamber having a plurality of feed nozzles, the starting components can be fed in individually and thoroughly mixed in the mixing chamber. It has proven advantageous to employ the two-component process.

According to a particularly advantageous embodiment, a prepolymer containing NCO groups is first prepared in a two-stage process. For this purpose, the component (b) is reacted with (a) in excess, usually at temperatures of from 80° C. to 160° C. The reaction time is tailored to the achievement of the theoretical NCO content.

Accordingly, the production, according to the invention, of the moldings is preferably effected in a two-stage process by preparing a prepolymer having isocyanate groups in a first stage by reacting (a) with (b) and reacting this prepolymer in a second stage in a mold with a crosslinking component comprising (d) and (e), the prepolymer and/or the crosslinking component comprising (c) and, if appropriate, (f), (g) and/or (h).

The component (c) can be added in the two-stage process both to the prepolymer before, during and/or after its preparation and/or after the crosslinking components. The assistants and/or additives (h) can preferably be present in the crosslinking component.

For improving the demolding of the moldings produced according to the invention it has proven advantageous to coat the inner surfaces of the mold, at least at the beginning of a production series, with conventional external lubricants, for example based on wax or silicone, or in particular with aqueous soap solutions.

The molding times are on average from 5 to 40 minutes, depending on the size and geometry of the shaped article.

After the production of the shaped articles in the mold, the shaped article can preferably be heated at temperatures of, usually, from 70 to 140° C. for a duration of from 1 to 48 hours.

Regarding the starting components present in the reaction mixture according to the invention the following may be stated:

Isocyanates (a) used may be generally known (cyclo)aliphatic and/or aromatic polyisocyanates. For the production of the composite elements according to the invention aromatic diisocyanates are particularly suitable, preferably diphenylmethane 2,2′-, 2,4′- and/or 4,4′-diisocyanate (MDI), naphthylene 1,5-diisocyanate (NDI), toluene 2,4- and/or 2,6-diisocyanate (TDI), dimethylbiphenyl 3,3′-diisocyanate, diphenylethane 1,2-diisocyanate and p-phenylene diisocyanate, and/or (cyclo)aliphatic isocyanate, such as, for example hexamethylene 1,6-diisocyanate, 1-isocyanato-3,3,5-trimethyl-5-isocyanatomethylcyclohexane, and/or polyisocyanates, such as, for example, polyphenylpolymethylene polyisocyanates. The isocyanate may be used in the form of the pure compound, in mixtures and/or in modified form, for example in the form of uretdiones, isocyanurates, allophanates or biurets, preferably in the form of reaction products comprising urethane and isocyanate groups, so-called isocyanate prepolymers. Optionally modified diphenylmethane 2,2′-, 2,4′- and/or 4,4′-diisocyanate (MDI), naphthylene 1,5-diisocyanate (NDI), toluene 2,4- and/or 2,6-diisocyanate (TDI) and/or mixtures of these isocyanates are preferably used, particularly preferably diphenylmethane 2,2′-, 2,4′- and/or 4,4′-diisocyanate (MDI), particularly preferably diphenylmethane 4,4′-diisocyanate with up to 2.5% by weight of diphenylmethane 2,4′-diisocyanate, based on the total weight of diphenylmethane 4,4′-diisocyanate and diphenylmethane 2,4′-diisocyanate.

The polyetherols described above are used as compounds (b) reactive to isocyanates. Said polyetherols can, if appropriate, be used together with generally known polyhydroxyl compounds, preferably those having a functionality of from 2 to 3 and preferably a molecular weight of from 60 to 7000, particularly preferably from 500 to 6000, in particular from 800 to 6000. If appropriate, polyether ester polyols, polyester polyalcohols and/or polycarbonates containing hydroxyl groups are preferably used in addition to the polyetherols according to the invention as (b). Particularly preferably, exclusively the polyetherols according to the invention are used as component (b).

In addition to the components described above which are reactive toward isocyanates, it is furthermore possible to use low molecular weight chain extenders (b5) having a molecular weight of less than 500, preferably from 60 to 499, for example selected from the group consisting of the difunctional alcohols and difunctional polyoxyalkylene polyols. For example, alkanediols having 2 to 12, preferably 2, 4 or 6, carbon atom may be used as (b5), e.g. ethane-, 1,3-propane-1,5-pentane-, 1,6-hexane-, 1,7-heptane-, 1,8-octane-, 1,9-nonane- or 1,10-decanediol and preferably 1,4-butanediol, dialkylene glycols having 4 to 8 carbon atoms, such as, for example, diethylene glycol and dipropylene glycol and/or difunctional polyoxyalkylenepolyols. Alkyl-substituted aromatic polyamines having molecular weights of, preferably, from 122 to 400, in particular primary aromatic diamines which have, in the ortho position relative to the amino groups, at least one alkyl substituent which reduces the reactivity of the amino group by steric hindrance and which are liquid at room temperature and at least partly but preferably completely miscible with the higher molecular weight, preferably at least difunctional compounds (b) under the processing conditions. For the production of the moldings according to the invention, industrially readily available 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, so-called DETDA, isomer mixtures of 3,3'-di- or 3,3',5,5'-tetraalkyl-substituted 4,4'-diaminodiphenylmethane having 1 to 4 carbon atoms in the alkyl radical, in particular 3,3',5,5'-tetraalkyl-substituted 4,4'-diaminodiphenylmethane comprising methyl, ethyl and isopropyl radicals in bound form and mixtures of said tetraalkyl-substituted 4,4'-diaminodiphenylmethanes and DETDA. In order to achieve special mechanical properties, it may also be expedient to use the alkyl-substituted aromatic polyamine as a mixture with the abovementioned low molecular weight polyhydric alcohols, preferably dihydric and/or trihydric alcohols or dialkylene glycols.

According to the invention the preparation of the cellular polyisocyanate polyadduct is preferably carried out in the presence of water (e). The water acts both as a crosslinking agent with formation of urea groups, owing to the reaction with isocyanate groups with formation of carbon dioxide, as a blowing agent. Because of this dual function, it is mentioned in this document separately from (b) and (g). By definition, the components (b) and (g) therefore comprise no water which by definition is mentioned exclusively as (e).

The amounts of water which can expediently be used are from 0.01 to 5% by weight, preferably from 0.3 to 3.0% by weight, based on the weight of the component (b). The water can be completely or partly used in the form of the aqueous solutions of the sulfated fatty acid ester.

In order to accelerate the reaction, generally known catalysts (f) may be added to the reaction batch, both during the preparation of a prepolymer and, if appropriate, during the reaction of a prepolymer with a crosslinking component. The catalysts (f) can be added individually as well as in a mixture with one another. The preferred catalysts were described above. These can, if appropriate, be used together with other generally known catalysts, for example organometallic compounds, such as tin(II) salts of organic carboxylic acids, e.g. tin(II) dioctoate, tin(II) dilaurate, dibutyltin diacetate and dibutyltin dilaurate, and tertiary amines, such as tetramethylethylenediamine, N-methylmorpholine, diethylbenzylamine, triethylamine, dimethylcyclohexylamine, diazabicyclooctane, N,N'-dimethylpiperazine, N-methyl, N'-(4-N-dimethylamino)-butylpiperazine, N,N,N',N'', N''-pentamethyldiethylenediamine or the like. The following are furthermore suitable as catalysts: amidines, such as, for example, 2,3-dimethyl-3,4,5,6-tetrahydropyrimidine, tris(dialkylaminoalkyl)-s-hexahydrotriazines, in particular tris-(N,N-dimethylaminopropyl)-s-hexahydrotriazine, tetraalkylammonium hydroxides, such as, for example, tetramethylammonium hydroxide, alkali metal hydroxides, such as, for example, sodium hydroxide, and alkali metal alcoholates, such as, for example, sodium methylate and potassium isopropylate and alkali metal salts of long-chain fatty acids having 10 to 20 carbon atoms and, if appropriate, OH side groups.

Depending on the reactivity to be established, the catalysts (f) are used in amounts of 0.0001 to 0.5% by weight, based on the prepolymer.

If appropriate, conventional blowing agents (g) may be used in the polyurethane preparation. For example, low-boiling liquids which evaporate under the influence of the exothermic polyaddition reaction are suitable. Liquids which are inert to the organic polyisocyanate and have boiling points below 100° C. are suitable. Examples of such preferably used liquids are halogenated, preferably fluorinated hydrocarbons, such as, for example, methylene chloride and dichloromonofluoromethane, perfluorinated or partly fluorinated hydrocarbons, such as, for example, trifluoromethane, difluoromethane, difluoroethane, tetrafluoroethane and heptafluoropropane, hydrocarbons, such as, for example, n-butane, isobutane, n-pentane and isopentane, and the industrial mixtures of these hydrocarbons, propane, propylene, hexane, heptane, cyclobutane, cyclopentane and cyclohexane, dialkyl ethers, such as, for example, dimethyl ether, diethyl ether and furan, carboxylates, such as, for example, methyl and ethyl formate, ketones, such as, for example, acetone, and/or fluorinated and/or perfluorinated, tertiary alkylamines, such as, for example, perfluorodimethyl-isopropylamine. Mixtures of these low-boiling liquids with one another and/or with other substituted or unsubstituted hydrocarbons may also be used.

The most expedient amount of low-boiling liquid for the production of such cellular resilient moldings from elastomers comprising bound urea groups depends on the density which it is intended to achieve and on the amount of water preferably concomitantly used. In general, amounts of from 1 to 15% by weight, preferably from 2 to 11% by weight, based on the weight of the component (b), give satisfactory results. Particularly preferably, exclusively water (e) is used as the blowing agent.

Assistants and additives (h) may be used in the production, according to the invention, of the shaped articles. These include, for example, generally known surface-active substances, hydrolysis stabilizers, fillers, antioxidants, cell regulators, flameproofing agents and dyes. Suitable surface-active substances are compounds which serve for promoting the homogenization of the starting material and, if appropriate, are also suitable for regulating the cell structure. Compounds in addition to the emulsifiers according to the invention and having an emulsifying effect, such as the salts of fatty acids with amines, for example of oleic acid with diethylamine, of stearic acid with diethanolamine, of ricinoleic acid with diethanolamine, salts of sulfonic acids, for example alkali metal or ammonium salts of dodecylbenzene- or dinaphthylmethanedisulfonic acid may be mentioned by way of example. Foam stabilizers, such as, for example, oxyethylated alkylphenols, oxyethylated fatty alcohols, liquid paraffins, castor oil esters or ricinoleic esters, Turkey red oil and peanut oil, and cell regulators consist of paraffins and fatty alcohols, are furthermore suitable. The surface-active substances are usually used in amounts of from 0.01 to 5 parts by weight, based on 100 parts by weight of the components (b). By definition, the compounds (c) and (d) are not covered by the assistants and additives (h).

The invention is to be explained in more detail by the following examples. All prepolymers according to the invention had a shelf life of several weeks at room temperature. Before the further processing, they were heated to 80° C. for 16 h and stirred for 2-3 min. The prepolymer viscosities were measured using a rotation viscometer from Rheometrics Scientific.

The static mechanical properties were determined from blocks, and the dynamic mechanical properties from spring elements (cf. FIG. 1).

EXAMPLE 1

According to the Invention

Preparation of the Prepolymer Comprising NCO Groups 57.0 parts by weight of polytetrahydrofuran 2000 (PolyTHF 2000 from BASF Aktiengesellschaft) and 14.3 parts by weight of polytetrahydrofuran 1000 (PolyTHF 1000 from BASF Aktiengesellschaft) and 0.2 part by weight of silicone-based foam stabilizer (DC 193 from Dow Corning) were heated to 140° C. under a nitrogen atmosphere in a three-necked flask, and 28.5 parts by weight of 4,4'-diisocyanatodiphenylmethane (Lupranat® MES from BASF Aktiengesellschaft) were added with stirring. The reaction temperature was kept at 145° C. for 10 min to complete the reaction and to synthesize allophanate and cooling was then effected. A virtually colorless liquid having an NCO content of 5.7%, an allophanate content of 0.2% and a viscosity of 1600 mPas at 80° C. resulted.

2) Preparation of the Crosslinking Component:
  74.1 parts by weight of 50% strength aqueous solution of a fatty acid sulfate
  24.6 parts by weight of nonionic emulsifier polyethylene glycol (PEG-40) sorbitol hexaoleate
  0.4 part by weight of di-n-octyltin bis(2-ethylhexylthioglycolate)
  0.9 part by weight of a mixture of Lupragen® N 202 (BASF Aktiengesellschaft) and Niax® catalyst E-A-1 (GE Silicones), catalysts 3) Production of the Cylindrical Molding
100 parts by weight of the prepolymer according to (1) were mixed with 3.03 parts by weight of the crosslinking component according to (2) with the aid of a low pressure casting machine at 80° C. prepolymer temperature and 35° C. crosslinking agent temperature, the mixture was introduced into a closable mold thermostatted at 75° C. (for example having the spring geometry according to FIG. 1) and the foam was cured at 75° C. for 15 min. After removal of the microcellular product from the mold the shaped article was thermally postcured for 14 h at 110° C.

EXAMPLE 2

According to the Invention

Preparation of the Prepolymer Comprising NCO Groups 27.7 parts by weight of 4,4'-diisocyanatodiphenylmethane (Lupranat® MES from BASF Aktiengesellschaft) were melted under a nitrogen atmosphere in a three-necked flask, and a mixture of 54.1 parts by weight of polytetrahydrofuran 2000 (PolyTHF 2000 from BASF Aktiengesellschaft), 13.5 parts by weight of polytetrahydrofuran 1000 (PolyTHF 1000 from BASF Aktiengesellschaft) and 4.7 parts by weight of polyoxypropylene (80% by weight)-polyoxyethylene (20% by weight) glycol (hydroxyl number 27 mg KOH/g; molecular weight 5180 g/mol, prepared using glycerol as initiator molecule) was added at 60° C. with stirring. The mixture was heated to 100° C. for 1.5 hours to complete the reaction and then cooled. A virtually colorless liquid having an NCO content of 5.7% and a viscosity of 1900 mPas at 80° C. resulted.

2) Preparation of the Crosslinking Component:
  71.2 parts by weight of a 50% strength aqueous solution of a fatty acid sulfate
  23.7 parts by weight of nonionic emulsifier polyethylene glycol (PEG-40) sorbitol hexaoleate
  3.9 parts by weight of a silicone-based foam stabilizer (DC 193 from Dow Corning)
  0.3 part by weight of di-n-octyltin bis(2-ethylhexylthioglycolate)
  0.9 part by weight of a mixture of Lupragen® N 202 (BASF Aktiengesellschaft) and Niax® catalyst E-A-1 (GE Silicones), catalysts 3) Production of the Cylindrical Molding
100 parts by weight of the prepolymer according to (1) were mixed with 3.03 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min. After removal of the microcellular product from the mold the shaped article was thermally postcured for 14 h at 110° C.

EXAMPLE 3

According to the Invention

Preparation of the Prepolymer Comprising NCO Groups 64.6 parts by weight of polytetrahydrofuran 2000 (PolyTHF 2000 from BASF Aktiengesellschaft) and 7.2 parts by weight of polytetrahydrofuran 1000 (PolyTHF 1000 from BASF Aktiengesellschaft) and 0.2 part by weight of silicone-based foam stabilizer (DC 193 from Dow Corning) were heated to 140° C. under a nitrogen atmosphere in a three-necked flask, and 28.0 parts by weight of 4,4'-diisocyanatodiphenylmethane (Lupranat® MES from BASF Aktiengesellschaft) were added with stirring. The reaction temperature was kept at 145° C. for 10 min to complete the reaction and to synthesize allophanate and then cooled. A virtually colorless liquid having an NCO content of 5.8%, an allophanate content of 0.2% and a viscosity of 2000 mPas at 80° C. resulted.

2) Preparation of the Crosslinking Component:
  74.0 parts by weight of a 50% strength aqueous solution of a sulfated fatty acid ester
  24.7 parts by weight of nonionic emulsifier polyethylene glycol (PEG-40) sorbitol hexaoleate 0.3 part by weight of di-n-octyltin bis(2-ethylhexylthioglycolate)

1.0 part by weight of a mixture of Lupragen® N 202 (BASF Aktiengesellschaft) and Niax® catalyst E-A-1 (GE Silicones), catalysts 3) Production of the Cylindrical Molding 100 parts by weight of the prepolymer according to (1) were mixed with 3.10 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min. After removal of the microcellular product from the mold the shaped article was thermally postcured for 14 h at 110° C.

EXAMPLE 4

According to the Invention

Preparation of the Prepolymer Comprising NCO Groups 27.7 parts by weight of 4,4'-diisocyanatodiphenylmethane (Lupranat® MES from BASF Aktiengesellschaft) were melted under a nitrogen atmosphere in a three-necked flask, and a mixture of 60.9 parts by weight of polytetrahydrofuran 2000 (PolyTHF 2000 from BASF Aktiengesellschaft), 6.8 parts by weight of polytetrahydrofuran 1000 (PolyTHF 1000 from BASF Aktiengesellschaft) and 4.7 parts by weight of polyoxypropylene (80% by weight)-polyoxyethylene (20% by weight) glycol (hydroxyl number 27 mg KOH/g; molecular weight 5180 g/mol, prepared using glycerol as initiator molecule) was added at 60° C. with stirring. The mixture was heated to 90° C. for 1.5 hours to complete the reaction and then cooled. A virtually colorless liquid having an NCO content of 6.0% and a viscosity of 1400 mPas at 80° C. resulted.

2) Preparation of the Crosslinking Component:

94.5 parts by weight of a 50% strength aqueous solution of a fatty acid sulfate 4.1 parts by weight of a silicone-based foam stabilizer (DC 193 from Dow Corning)

0.5 part by weight of di-n-octyltin bis(2-ethylhexylthioglycolate)

0.9 part by weight of N-(2-dimethylaminoethyl)-N'-piperazine

3) Production of the Cylindrical Molding 100 parts by weight of the prepolymer according to (1) were mixed with 2.56 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min. After removal of the microcellular product from the mold the shaped article was thermally postcured for 14 h at 110° C.

EXAMPLE 5

According to the Invention

Preparation of the Prepolymer Comprising NCO Groups 27.4 parts by weight of 4,4'-diisocyanatodiphenylmethane (Lupranat® MES from BASF Aktiengesellschaft) were melted under a nitrogen atmosphere in a three-necked flask, and a mixture of 62.3 parts by weight of polytetrahydrofuran 2000 (PolyTHF 2000 from BASF Aktiengesellschaft), 6.9 parts by weight of polytetrahydrofuran 1000 (PolyTHF 1000 from BASF Aktiengesellschaft) and 3.4 parts by weight of polyoxypropylene (80% by weight)-polyoxyethylene (20% by weight) glycol (hydroxyl number 27 mg KOH/g; molecular weight 5180 g/mol, prepared using glycerol as initiator molecule) was added at 60° C. with stirring. The mixture was heated to 90° C. for 1.5 hours to complete the reaction and then cooled. A virtually colorless liquid having an NCO content of 5.9% and a viscosity of 1600 mPas at 80° C. resulted.

2) Preparation of the Crosslinking Component:

94.7 parts by weight of a 50% strength aqueous solution of a fatty acid sulfate 4.1 parts by weight of a silicone-based foam stabilizer (DC 193 from Dow Corning)

0.4 part by weight of di-n-octyltin bis(2-ethylhexylthioglycolate)

0.8 part by weight of N-(2-dimethylaminoethyl)-N'-piperazine

3) Production of the Cylindrical Molding 100 parts by weight of the prepolymer according to (1) were mixed with 2.4 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min. After removal of the microcellular product from the mold the shaped article was thermally postcured for 14 h at 110° C.

EXAMPLE 6

According to the Invention

Preparation of the Prepolymer Comprising NCO Groups 27.7 parts by weight of 4,4'-diisocyanatodiphenylmethane (Lupranat® MES from BASF Aktiengesellschaft) were melted under a nitrogen atmosphere in a three-necked flask, and a mixture of 47.8 parts by weight of polytetrahydrofuran 2000 (PolyTHF 2000 from BASF Aktiengesellschaft), 13.7 parts by weight of polytetrahydrofuran 1000 (PolyTHF 1000 from BASF Aktiengesellschaft), 6.1 parts by weight of polytetrahydrofuran 1800 (PolyTHF 1800 from BASF Aktiengesellschaft) and 4.7 parts by weight of polyoxypropylene (80% by weight)-polyoxyethylene (20% by weight) glycol (hydroxyl number 27 mg KOH/g; molecular weight 5180 g/mol, prepared using glycerol as initiator molecule) was added at 60° C. with stirring. The mixture was heated to 100° C. for 1.5 hours to complete the reaction and then cooled. A virtually colorless liquid having an NCO content of 5.7% and a viscosity of 2100 mPas at 70° C. resulted.

2) Preparation of the Crosslinking Component: cf. example 5 (according to the invention)

3) Production of the Cylindrical Molding 100 parts by weight of the prepolymer according to (1) were mixed with 2.3 parts by weight of the crosslinking component according to (2) with the aid of a low pressure casting machine at 70° C. prepolymer temperature and 35° C. crosslinking agent temperature, the mixture was introduced into a closable mold at 70° C. (for example having the spring geometry according to FIG. 1) and the foam was cured at 70°

C. for 15 min. After removal of the microcellular product from the mold the shaped article was thermally postcured for 14 h at 110° C.

EXAMPLE 7

According to the Invention

Preparation of the Prepolymer Comprising NCO Groups 26.5 parts by weight of 4,4'-diisocyanatodiphenylmethane (Lupranat® MES from BASF Aktiengesellschaft) were melted under a nitrogen atmosphere in a three-necked flask, and a mixture of 55.0 parts by weight of polytetrahydrofuran 2000 (PolyTHF 2000 from BASF Aktiengesellschaft), 13.8 parts by weight of a polypropylene oxide (Acclaim™ Polyol 2200 from BAYER AG, hydroxyl number of 56 mg KOH/g, molecular weight 2000 g/mol) and 4.7 parts by weight of polyoxypropylene (80% by weight)-polyoxyethylene (20% by weight) glycol (hydroxyl number 27 mg KOH/g; molecular weight 5180 g/mol, prepared using glycerol as initiator molecule) was added at 60° C. with stirring. The mixture was heated to 100° C. for 1.5 hours to complete the reaction and then cooled. A virtually colorless liquid having an NCO content of 5.8% and a viscosity of 1200 mPas at 75° C. resulted.

2) Preparation of the Crosslinking Component: cf. example 2 (according to the invention)

3) Production of the Cylindrical Molding 100 parts by weight of the prepolymer according to (1) were mixed with 3.10 parts by weight of the crosslinking component according to (2) with the aid of a low pressure casting machine at 75° C. prepolymer temperature and 35° C. crosslinking agent temperature, the mixture was introduced into a closable mold at 67° C. (for example having the spring geometry according to FIG. 1) and the foam was cured at 67° C. for 15 min. After removal of the microcellular product from the mold the shaped article was thermally postcured for 14 h at 110° C.

EXAMPLE 8

According to the Invention

Preparation of the Prepolymer Comprising NCO Groups 26.4 parts by weight of 4,4'-diisocyanatodiphenylmethane (Lupranat® MES from BASF Aktiengesellschaft) were melted under a nitrogen atmosphere in a three-necked flask, and a mixture of 54.2 parts by weight of polytetrahydrofuran 2000 (PolyTHF 2000 from BASF Aktiengesellschaft), 13.5 parts by weight of a polypropylene oxide (hydroxyl number of 55 mg KOH/g, molecular weight 1970 g/mol, prepared using propylene glycol as an initiator molecule) and 5.9 parts by weight of polyoxypropylene (80% by weight)-polyoxyethylene (20% by weight) glycol (hydroxyl number 27 mg KOH/g; molecular weight 5180 g/mol, prepared using glycerol as an initiator molecule) was added at 60° C. with stirring. The mixture was heated to 100° C. for 1.5 hours to complete the reaction and then cooled. A virtually colorless liquid having an NCO content of 5.8% and a viscosity of 1400 mPas at 75° C. resulted.

2) Preparation of the Crosslinking Component:
  94.7 parts by weight of a 50% strength aqueous solution of a sulfated fatty acid ester
  4.1 parts by weight of a silicone-based foam stabilizer (DC 193 from Dow Corning)
  0.4 part by weight of di-n-octyltin bis(2-ethylhexylthioglycolate)
  0.8 part by weight of N-(2-dimethylaminoethyl)-N'-piperazine 3) Production of the Cylindrical Molding 100 parts by weight of the prepolymer according to (1) were mixed with 2.34 parts by weight of the crosslinking component according to (2) with the aid of a low pressure casting machine at 75° C. prepolymer temperature and 35° C. crosslinking agent temperature, the mixture was introduced into a closable mold at 67° C. (for example having the spring geometry according to FIG. 1) and the foam was cured at 67° C. for 15 min. After removal of the microcellular product from the mold the shaped article was thermally postcured for 14 h at 110° C.

COMPARATIVE EXAMPLE 1

1) Preparation of the Prepolymer Comprising NCO Groups 70.7 parts by weight of poly(ethylenebutylene adipate) (hydroxyl number of 56 mg KOH/g, molecular weight 2000 g/mol), 0.4 part by weight of 1,4-butanediol and 0.2 part by weight of a silicone-based foam stabilizer (DC 193 from Dow Corning) were heated to 140° C. under a nitrogen atmosphere in a three-necked flask, and 28.6 parts by weight of 4,4'-diisocyanatodiphenylmethane (Lupranat® MES from BASF Aktiengesellschaft) were added with stirring. The reaction temperature was kept at 145° C. for 10 min to complete the reaction and to synthesize allophanate and cooling was then effected. A virtually colorless liquid having an NCO content of 6.0%, an allophanate content of 0.2% and a viscosity of 1900 mPas at 90° C. resulted.

2) Preparation of the Crosslinking Component
  74.4 parts by weight of a 50% aqueous solution of a sulfated fatty acid ester
  21.3 parts by weight of 2,2',6,6'-tetraisopropyldiphenylcarbodiimide
  3.2 parts by weight of a silicone-based foam stabilizer (DC 193 from Dow Corning)
  0.9 part by weight of a mixture of fatty acid polyglycol esters and amine salts of alkylbenzenesulfonates
  0.2 part by weight of a mixture of 30% by weight of pentamethyl-diethylenetriamine and 70% by weight of N-methyl-N'-(dimethylaminoethyl)piperazine 3) Production of the Cylindrical Molding 100 parts by weight of the prepolymer according to (1) were mixed with 3.22 parts by weight of the crosslinking component according to (2) with the aid of a low pressure casting machine at 90° C. prepolymer temperature and 50° C. crosslinking agent temperature, the mixture was introduced into a closable mold at 85° C. (for example having the spring geometry according to FIG. 1) and the foam was cured at 85° C. for 20 min. After removal of the microcellular product from the mold the shaped article was thermally postcured for 14 h at 110° C.

COMPARATIVE EXAMPLE 2

1) Preparation of the Prepolymer Comprising NCO Groups 26.7 parts by weight of 4,4'-diisocyanatodiphenylmethane (Lupranat® MES from BASF Aktiengesellschaft) were melted under a nitrogen atmosphere in a three-necked flask, and 73.3 parts by weight of polytetrahydrofuran 2000 (hydroxyl number of 56 mg KOH/g, molecular weight 2000 g/mol) were added at 60° C. with stirring. The mixture was heated at 90° C. for 1.5 hours to complete the reaction and then cooled. A virtually colorless liquid having an NCO content of 5.8% and a viscosity of 1400 mPas at 80° C. resulted.

2) Preparation of the Crosslinking Component cf. example 2 (according to the invention)

3) Production of the Cylindrical Molding 100 parts by weight of the prepolymer according to (1) were mixed with 3.24 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min.

On demolding, the spring elements tore in the region of the undercuts, such as, for example, the bending lip. The tears were irreversible and could not be closed even by subsequent thermal postcuring of the shaped articles for 14 h at 110° C. Because of this damage, the shaped articles were not subjected to dynamic testing and the blocks, too, were not investigated with regard to the mechanical characteristics.

COMPARATIVE EXAMPLE 3

1) Preparation of the Prepolymer Comprising NCO Groups 27.0 parts by weight of 4,4'-diisocyanatodiphenylmethane (Lupranat® MES from BASF Aktiengesellschaft) were melted under a nitrogen atmosphere in a three-necked flask, and a mixture of 72.9 parts by weight of polytetrahydrofuran 2000 (hydroxyl number of 56 mg KOH/g, molecular weight 2000 g/mol) and 0.1 part by weight of trimethylolpropane was added at 60° C. with stirring. The mixture was heated at 90° C. for 1.5 hours to complete the reaction and then cooled. A virtually colorless liquid having an NCO content of 5.9% and a viscosity of 1600 mPas at 80° C. resulted.

2) Preparation of the Crosslinking Component cf. example 2 (according to the invention)

3) Production of the Cylindrical Molding 100 parts by weight of the prepolymer according to (1) were mixed with 3.30 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min.

As already described in comparative example 2, the shaped articles having an undercut were removed from the mold with irreversible tears. Neither the blocks nor the shaped articles were investigated with regard to their mechanical or dynamic properties.

COMPARATIVE EXAMPLE 4

1) Preparation of the Prepolymer Comprising NCO Groups 27.3 parts by weight of 4,4'-diisocyanatodiphenylmethane (Lupranat® MES from BASF Aktiengesellschaft) were melted under a nitrogen atmosphere in a three-necked flask, and a mixture of 72.5 parts by weight of polytetrahydrofuran 2000 (hydroxyl number of 56 mg KOH/g, molecular weight 2000 g/mol) and 0.2 part by weight of trimethylolpropane was added at 60° C. with stirring. The mixture was heated at 90° C. for 1.5 hours to complete the reaction and then cooled. A virtually colorless liquid having an NCO content of 5.9% and a viscosity of 1800 mPas at 80° C. resulted.

2) Preparation of the Crosslinking Component cf. example 2 (according to the invention)

3) Production of the Cylindrical Molding 100 parts by weight of the prepolymer according to (1) were mixed with 3.30 parts by weight of the crosslinking component according to (2) with the aid of a low pressure casting machine at 80° C. prepolymer temperature and 35° C. crosslinking agent temperature, the mixture was introduced into a closable mold at 75° C. (for example having the spring geometry according to FIG. 1) and the foam was cured at 75° C. for 15 min.

As already described in comparative example 2, the shaped articles having an undercut were removed from the mold with irreversible tears. Neither the blocks nor the shaped articles were investigated with regard to their mechanical or dynamic properties.

Test Conditions

The moldings were tested with regard to their mechanical and dynamic properties under the conditions described below.

The glass transition temperature was determined according to ISO 6721-7 on S3A tensile test bars made from the finished article with the aid of a torsional vibrator according to the principle of forced vibration. The glass transition temperature was determined at the maximum of the loss modulus G". The samples were cooled to −80° C., kept at this temperature for 5 min and then heated to 40° C. at a heating rate of 2 K/min. The measuring frequency was 1 Hz.

The static mechanical properties (the density of the test specimens was 0.5 g/cm$^3$ in each case) were measured on the basis of the tensile strength according to DIN EN ISO 845, of the elongation at break according to DIN EN ISO 1798, of the tear propagation resistance according to DIN ISO 34-1B(b) and of the compression set at 80° C. as a modification of DIN EN ISO 17981 using 18 mm high spacers and test specimens having a base area of 40×40 mm and a height of 30±1 mm. The test specimens prestressed by 40% were stored for 22 h at 80° C. and then left to cool in the prestressed state for 2 h at 23° C. The compression set (CR) was calculated according to the equation $$CR = [(H_0 - H_2)/(H_0 - H_1)] \cdot 100 [\%]$$

where $H_0$ is the original height of the test specimen in mm, $H_1$ is the height of the test specimen in the deformed state in mm, $H_2$ is the height of the test specimen after relaxation in mm.

The dynamic mechanical properties of the test specimens were determined on the basis of the permanent deformation. The test specimens consisted of a cylindrical test spring (cf. FIG. 1). The test specimens were subjected to 100 000 load changes with a force of 6 kN and a frequency of 1.2 Hz. The determination of the height $H_R$ for determining the permanent deformation after the dynamic test was effected after recording the characteristic of the spring: $H_o$ is the starting height. The molding was precompressed three times with maximum force. The characteristic was then recorded in the 4th cycle. The rate of depression was 50 mm/min. After 10 min, $H_1$ was determined, i.e. that of the component after recording of the characteristic. Only thereafter did the dynamic test start. After the dynamic mechanical testing of the test specimens the permanent deformation (PD) was determined according to the following equation:

$$PD = [(H_0 - H_R)/H_0] \cdot 100 [\%]$$

where $H_0$ is the original height of the test specimen in mm, $H_R$ is the residual height of the test specimen after the dynamic test, measured after storage for 24 hours at 23° C. and 50% relative humidity.

The permanent deformation is a measure of the remaining deformation of the cellular PU elastomer during the continuous vibration test. The smaller this value, the higher is the dynamic efficiency of the material. The dynamic tests were effected while cooling with a fan in an air-conditioned room at 23° C. and 50% relative humidity.

The low-temperature characteristic of the cylindrical test spring (cf. FIG. 1) was recorded without precompression in a conditioned chamber at −40° C. The rate of depression was 50 mm/min. The longer the distance covered at the force of 6 kN (=spring deflection), the softer is the spring and the higher its low-temperature flexibility.

The testing of the microbe resistance is effected on the basis of ISO 846, method D, 1997 edition, on spring elements (cf. FIG. 1) with the aid of a burying test. The spring elements to be investigated were prestressed to half the starting height in a clamping apparatus and then stored for 6 weeks at 28° C. in biologically active earth (moisture is adjusted to 60% of the maximum water capacity). If no substantial change (e.g. tearing/decomposition) is observed, the foam material is resistant to microbes.

The table below summarizes the material properties of the cellular elastomers according to the invention (examples 1 to 8) and of the comparative foams (comparative examples 1 to 3).

The moldings produced according to examples 1 to 8 according to the invention (cf. FIG. 1) could be removed from the mold without tearing after a uniform curing time of 15 minutes. In comparison, the moldings of comparative examples 2, 3 and 4 tore in the region of strong undercuts, in particular in the region of the bending lip. Since the torn moldings were not investigated further, no material data are stated for these examples.

The cellular polyurethane elastomers according to the invention have a high mechanical property level (cf. tensile strength, elongation at break, tear propagation resistance and in particular compression set at 80° C.) and are distinguished by extremely good stability to hydrolysis in a humid warm environment. In contrast, the foam of comparison example 1 having a polyester soft phase hydrolyzed.

Furthermore, the material according to the invention is distinguished by outstanding resistance to microbes.

The low-temperature flexibility was investigated both on complete spring elements by recording of the force-displacement curve at −40° C. and on test specimens which were taken from the components. The lower the glass transition temperature and the greater the value for the spring deflection, the better is the low-temperature flexibility. The elastomer foams according to the invention have both low glass transition temperatures and high spring deflections.

The dynamic material properties were determined on the spring element shown in FIG. 1. All spring elements according to the invention underwent the dynamic testing and gave low and therefore advantageous permanent deformations.

Thus, with comparatively low material costs, the foams according to the invention combine a high dynamic property level with stability to hydrolysis and microbe resistance, which permits long use of the material even under unfavorable ambient conditions.

TABLE 1

Material properties of the cellular polyurethane elastomers according to the invention (Examples 1 to 8) and of comparative examples 1 to 3

| | Unit | 1 | 2 | 3 | 4 | 5 | Measurement |
|---|---|---|---|---|---|---|---|
| Prepolymer NCO | [%] | 5.7 | 5.7 | 5.8 | 6.0 | 5.9 | |
| Soft phase polyols: | | | | | | | |
| Polytetrahydrofuran 2000 | [% by weight] | 80 | 75 | 90 | 84 | 86 | |
| Polytetrahydrofuran 1800 | | — | — | — | — | — | |
| Polytetrahydrofuran 1000 | | 20 | 19 | 10 | 9 | 9 | |
| Polypropylene oxide (M: 2000) | | — | — | — | — | — | |
| Polyether alcohol (M: 5200) | | — | 6 | — | 7 | 5 | |
| Poly(ethylenebutylene adipate) | | — | — | — | — | — | |
| Damage to the molding (cf. FIG. 1) | | none | none | none | none | none | |
| Static mechanical properties: | | | | | | | |
| Component density | [kg/m³] | 420 | 440 | 440 | 440 | | DIN EN ISO 845 |
| Tensile strength | [mPa] | 5 | 5 | 5 | 5 | | DIN EN ISO 1798 |
| Elongation at break | [%] | 480 | 460 | 460 | 400 | | DIN EN ISO 1798 |
| Tear propagation resistance | [N/mm] | 17 | 16 | 18 | 16 | | DIN ISO 34-1B(b) |
| Permanent deformation (40% deformation, 22 h 80° C. + 2 h 23° C.) | [%] | 20 | 25 | 23 | 23 | | DIN EN ISO 1856 |
| Permanent deformation (40% deformation, 22 h 70° C.) | [%] | 5 | 5 | 5 | 4 | | DIN EN ISO 1856 |
| Decrease in tensile strength in a humid warm environment (resistance to hydrolysis): | | | | | | | |
| Relative decrease in tensile strength in a humid warm environment*** ) after a storage time of several days (d) | [%] 0 d | 100 | 100 | | | 100 | DIN EN ISO 1798 |
| | 7 d | 112 | 96 | | | 98 | |
| | 14 d | 124 | 93 | | | 95 | |
| | 21 d | 99 | 90 | | | 93 | |
| | 42 d | 91 | 77 | | | 73 | |
| | 56 d | 85 | 71 | | | 64 | |
| | 70 d | 76 | 70 | | | 64 | |
| | 80 d | 69 | 70 | | | 58 | |
| Microbe resistance: (+) resistant/(−) not resistant | | (+) | (+) | (+) | (+) | (+) | Based on ISO 846; see below Test conditions |

TABLE 1-continued

Material properties of the cellular polyurethane elastomers according to the invention (Examples 1 to 8) and of comparative examples 1 to 3

| Low-temperature flexibility | | | | | | | | |
|---|---|---|---|---|---|---|---|---|
| Glass transition temperature (max. loss modulus G″max) | [° C.] | | −61 | −62 | | | | ISO 6721-7 |
| Spring deflection (for spring. cf. FIG. 1) at 6 kN at −40° C. | [mm] | | 55 | 55 | 54 | 54 | 53 | see below Test conditions |
| Dynamic mechanical properties: | | | | | | | | |
| Permanent deformation****) of a spring (cf. FIG. 1) | [%] | | 11 | 9 | 10 | 8 | 11 | Test conditions****) |

| | Unit | 6 | 7 | 8 | Comp 1 | Comp 2 | Comp 3 | Measurement |
|---|---|---|---|---|---|---|---|---|
| Prepolymer NCO | [%] | 5.7 | 5.8 | 5.8 | 6.0 | 5.8 | 5.9 | |
| Soft phase polyols: | | | | | | | | |
| Polytetrahydrofuran M~2000 | [% by weight] | 66 | 75 | 74 | — | 100 | 100 | |
| Polytetrahydrofuran M~1800 | | 9 | — | — | — | — | — | |
| Polytetrahydrofuran M~1000 | | 19 | — | — | — | — | — | |
| Polypropylene oxide M~2000 | | — | 19 | 18 | — | — | — | |
| Polyether alcohol M~5200 | | 6 | 6 | 8 | — | — | — | |
| Poly(ethylenebutylene adipate) | | — | — | — | 100 | — | — | |
| Damage to the demolded spring element (cf. FIG. 1) | | none | none | none | none | tears | tears | |
| Static mechanical properties: | | | | | | | | |
| Component density | [kg/m³] | 440 | | 380 | 490 | n.m.) | n.m.) | DIN EN ISO 845 |
| Tensile strength | [mPa] | 4 | | 3 | 3 | n.m.) | n.m.) | DIN EN ISO 1798 |
| Elongation at break | [%] | 510 | | 400 | 500 | n.m.) | n.m.) | DIN EN ISO 1798 |
| Propagation resistance | [N/mm] | 17 | | 13 | 16 | n.m.) | n.m.) | DIN ISO 34-1B(b) |
| Permanent deformation (40% deformation, 22 h 80° C. + 2 h 23° C.) | [%] | 28 | | 12 | 35 | n.m.) | n.m.) | |
| Permanent deformation (40% deformation, 22 h 70° C. + 2 h 23° C.) | [%] | n.m.) | | 3 | 6 | n.m.) | n.m.**) | DIN EN ISO 1856 |
| Decrease in tensile strength in a humid warm environment (stability to hydrolysis): | | | | | | | | |
| Relative decrease in tensile strength in a humid warm environment*) after a storage time of several days (d) | [%] | 0 d | | | | 100 | n.m.) | n.m.**) | DIN EN ISO 1798 |
| | | 7 d | | | | 82 | n.m.) | n.m.) | |
| | | 14 d | | | | 55 | n.m.) | n.m.) | |
| | | 21 d | | | | 39 | n.m.) | n.m.) | |
| | | 42 d | | | | <10 | n.m.) | n.m.) | |
| | | 56 d | | | | destroyed | n.m.) | n.m.) | |
| | | 70 d | | | | destroyed | n.m.) | n.m.) | |
| | | 80 d | | | | destroyed | n.m.) | n.m.) | |
| Microbe resistance: (+) resistant/(−) not resistant | | (+) | (+) | (+) | (−) | n.m.) | n.m.) | Based on ISO 846; see below Test conditions |
| Low-temperature flexibility: | | | | | | | | |
| Glass transition temperature (max. loss modulus G″max) | [° C.] | | | | −32 | n.m.) | n.m.) | ISO 6721-7 |
| Spring deflection (for spring, cf. FIG. 1) at 6 kN at −40° C. | | 54 | 53 | 54 | 53 | n.m.) | n.m.) | |
| Dynamic mechanical properties: | | | | | | | | |
| Permanent deformation**) of a spring (cf. FIG. 1) | [%] | | | 9 | 11 | n.m.) | n.m.) | Test conditions**) |

**)n.m. = not measured
***)Storage of tensile strength test specimens in demineralized water thermostatted at 80° C. for a period of up to 80 days. Test specimens removed were cooled at 23° C. for 30 min, and the tensile strength according to DIN EN ISO 1798 was then determined.
****)Dynamic test conditions: load 6 kN; frequency 1.2 Hz; number of load changes after 100 000 cycles; fan cooling; the percentage permanent deformation (PD) is obtained from the percentage ratio of the residual height of the spring after the test ($H_R$) to the starting height of the spring $H_0$ before the test: PD = [($H_0$ − $H_R$)/$H_0$] − 100[%]

We claim:

1. A cellular polyisocyanate polyadduct prepared by
   (1) reacting (a) one or more diisocyanates with (b) one or more polyether alcohols to form a prepolymer comprising isocyanate groups and an NCO content of less than 10%, and
   (2) reacting said prepolymer in a mold with a crosslinking component comprising (e) water and, optionally, (d) one or more sulfated fatty acid esters;
   wherein said (b) one or more polyether alcohols comprises a mixture of (b1) and (b3) and optionally (b2), wherein:
   (b1) is a polytetrahydrofuran having a molecular weight of from 1800 to 2100 g/mol; and
   (b2) is a polyether alcohol having a molecular weight of from 500 to 7000 g/mol, based on ethylene oxide and/or propylene oxide; and
   (b3) is a polytetrahydrofuran having a molecular weight of from 800 to 1200 g/mol
   wherein said cellular polyisocyanate polyadduct has a density, according to DIN EN ISO 845, of from 200 to 800 kg/m$^3$; a tensile strength, according to DIN EN ISO 1798, of greater than or equal to 2.0 N/mm$^2$; an elongation at break, according to DIN EN ISO 1798, of greater than or equal to 200%; and a tear propagation resistance, according to DIN ISO 34-1 B (b), of greater than or equal to 8 N/mm.

2. The cellular polyisocyanate polyadduct of claim 1, wherein the weight ratio of (b1) to the sum of (b2) and (b3), wherein the weight of (b2) is optionally 0, is from 11:1 to 2:1.

3. The cellular polyisocyanate polyadduct of claim 1, wherein said (b) one or more polyether alcohols further comprises a polyether alcohol (b2) having a hydroxyl number of less than 500 mg KOH/g.

4. The cellular polyisocyanate polyadduct of claim 3, wherein said polyether alcohol (b2) is based on ethylene oxide and/or propylene oxide and glycerol and/or trimethylolpropane as an initiator.

5. The cellular polyisocyanate polyadduct of claim 1, wherein said mixture comprising (b1) and (b3) has a number average molecular weight of from 1500 g/mol to 1900 g/mol.

6. The cellular polyisocyanate polyadduct of claim 1, wherein said prepolymer further comprises allophanate groups.

7. The cellular polyisocyanate polyadduct of claim 1, wherein said crosslinking component further comprises catalysts (f) and, optionally, (c) polysiloxanes, (g) blowing agents, and/or (h) assistants.

8. The cellular polyisocyanate polyadduct of claim 1, wherein said crosslinking component further comprises tin compounds.

9. The cellular polyisocyanate polyadduct of claim 7, wherein said crosslinking component further comprises amine catalysts.

* * * * *